United States Patent

[11] 3,582,740

| | | | |
|---|---|---|---|
| [72] | Inventor | Owen E. Reinert | |
| | | St. Louis, Mo. | |
| [21] | Appl. No. | 872,536 | |
| [22] | Filed | Oct. 30, 1969 | |
| [45] | Patented | June 1, 1971 | |
| [73] | Assignee | Emerson Electric Co. | |
| | | St. Louis, Mo. | |

[54] REVERSIBLE SPEED DC MOTOR CONTROLLER UTILIZING RESONANT FIELD REVERSAL
5 Claims, 2 Drawing Figs.

[52] U.S. Cl. .................................................. 318/284,
    317/13, 318/300
[51] Int. Cl. ...................................................... H02p 1/22
[50] Field of Search ........................................... 318/257,
    300, 284; 317/13

[56] References Cited
UNITED STATES PATENTS

| 1,551,400 | 8/1925 | Jones............................. | 318/301 |
| 1,574,548 | 2/1926 | Benjamin ...................... | 318/301 |
| 2,917,672 | 12/1969 | Tremaine ...................... | 317/13 |
| 3,184,670 | 5/1965 | Reynolds........................ | 318/300 |
| 3,230,435 | 1/1966 | Andrews ....................... | 318/284 |
| 3,373,316 | 3/1968 | Palmer .......................... | 317/13 |
| 3,436,632 | 4/1969 | Tisserant et al................ | 318/284 |

Primary Examiner—Oris L. Rader
Assistant Examiner—K. L. Crosson
Attorney—Polster & Polster ABSTRACT: In a DC electric motor for which the current source is a rectified AC, a control circuit is provided whose function is to determine whether a current is present in the field of the motor. When such current is not present, the circuit prevents the firing of a silicon controlled rectifier supply circuit, thereby preventing abnormally high armature current during the period of reduced field current. The field circuit is modified by the addition of a capacitor in parallel with the motor field. The capacitor permits the easy interruption of the field circuit by some means and limits the rate of change in the field as seen by the armature circuit to a level sufficiently small to permit the current limit circuit to become operative.

INVENTOR
OWEN E. REINERT

Inventor
OWEN E. REINERT

REVERSIBLE SPEED DC MOTOR CONTROLLER UTILIZING RESONANT FIELD REVERSAL

BACKGROUND OF THE INVENTION

This invention relates to a motor control for DC electric motors that are excited by some form of rectified AC. Such DC machines are unidirectional in operation unless means are provided to reverse the polarity of the input voltage seen at the motor terminals. In the prior art, several methods of obtaining reversible DC motors were developed. The more general of these prior methods accomplished the desired reversal by some alteration of the armature circuit. While several circuits providing rotational control were developed based upon a concept of field reversal, rather expensive and intricate protective measures had to be used to protect both the switching mechanisms and the control circuit due to the reaction of the system to the instantaneous loss of the field during reversal. Because of the inherent problems associated with field reversal, alteration of the armature circuit was considered the most desirable means of obtaining a reversible DC motor.

One of the objects of this invention is to provide a means for reversing a DC motor that is simple, effective, and low in cost.

Another object of this invention is to provide protection to the entire motor circuit when directional reversal is accomplished by the application of bipolar DC source voltage to the motor field.

Other objects will become apparent to those skilled in the art in the light of the following description and accompanying drawings.

SUMMARY OF THE INVENTION

In accordance with this invention, generally stated, a control circuit for DC electric motors, for which the current source is a rectified AC, generally comprised of an external speed command potentiometer electrically connected to an amplifier, a negative feedback loop indicating motor speed electrically connected to the amplifier, an IR compensation loop electrically connected to the amplifier, a current limiting circuit electrically connected to the amplifier, which amplifier feeds a signal to a triggering circuit, the triggering circuit being electrically coupled to a silicon controlled rectifier circuit is provided with a field current monitor circuit electrically connected to the amplifier, and a capacitor connected in parallel with the motor field. The capacitor acts as a nonpolarized substitute for the discharge diode normally required where a half-wave rectifier circuit is connected to an inductive load. The field monitor circuit functions in such a manner as to prevent firing pulses to the silicon controlled rectifier circuit whenever the field is lost, as when rotational reversal is commanded.

DESCRIPTION OF THE PREFERRED EMBODIMENT

Figure 1:
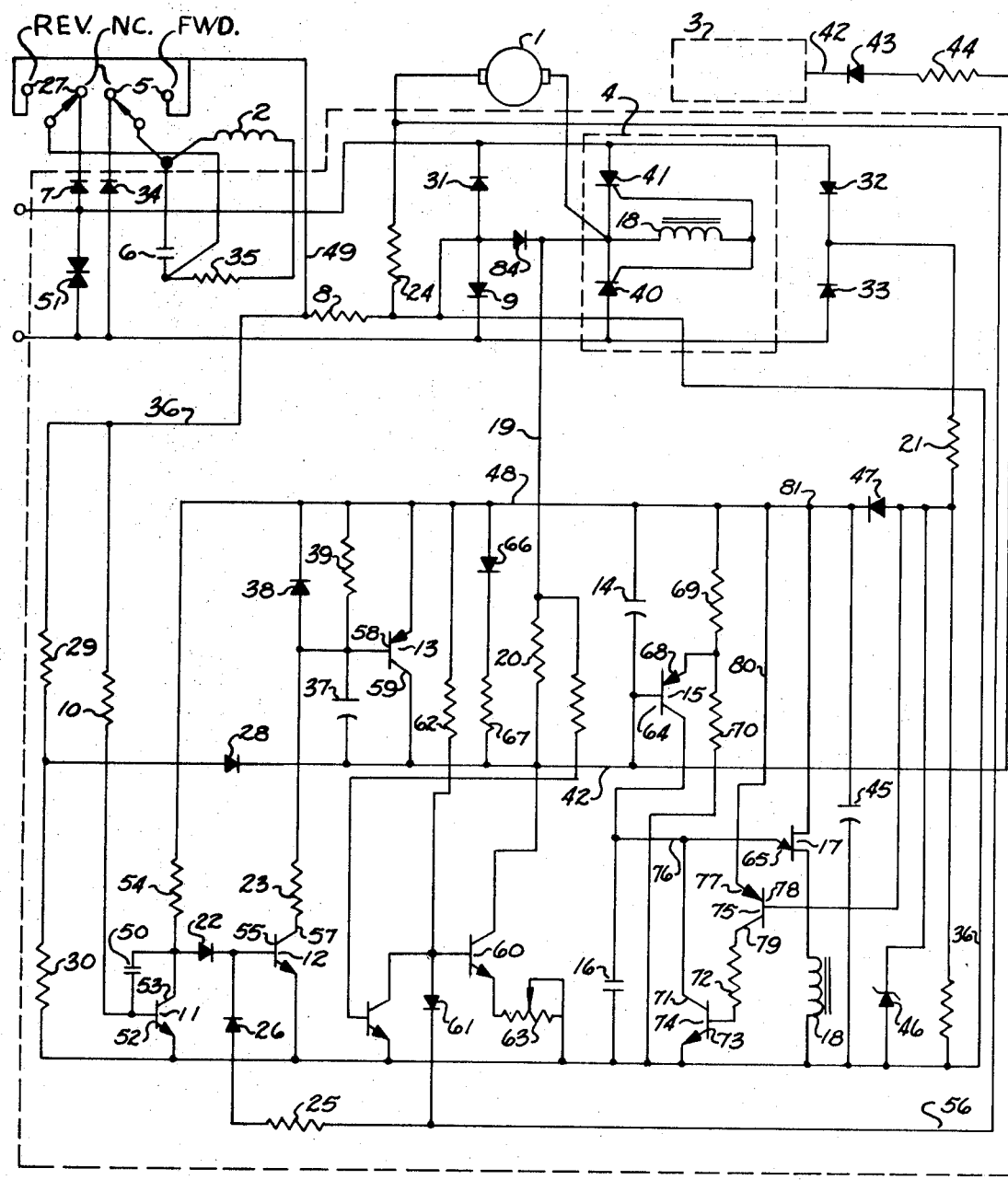
FIG. 1 is a diagrammatic view of one illustrative embodiment of control circuit of this invention including that portion of the circuit described in my copending application Ser. No. 872,535 filed Oct. 30, 1969, dealing with a variable IR compensation circuit.
Figure 2:
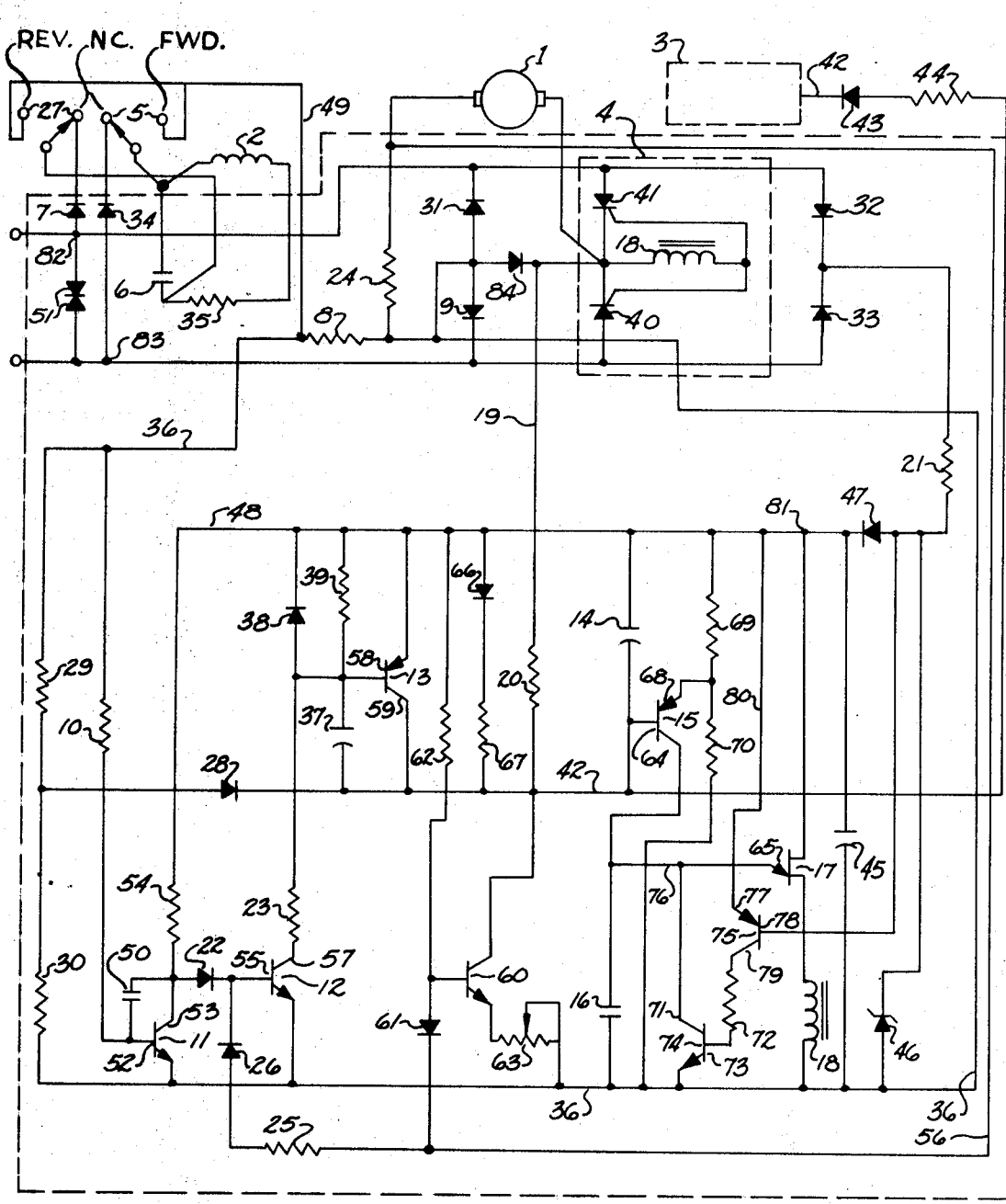
FIG. 2 is a simplified view of the circuit corresponding to FIG. 1, but with the circuit elements peculiar to the invention of my copending application not shown.

Referring now to FIG. 2 of the drawings, reference numeral 1 indicates a wound armature of a DC motor and reference numeral 2, its field winding. An AC power source not shown in FIG. 2 is connected to a full-wave bridge rectifier consisting of diodes 31, 9, 32 and 33. The position of a switch 5 or a switch 27 determines the direction of rotation for the machine. Both switches are shown in their normally closed or off position in FIG. 2 and the field is not excited as a diode 7 and a diode 34 alternatively present an open circuit to the closed loop of the field traced from either a node 82 or a node 83. A resistor 35 is in series with the field 2 and a capacitor 6 is in parallel with said field and resistor. The field 2 is additionally connected, when the motor is in operation, through either switch 27 or switch 5 via a line 49 to a resistor 8. If switch 5 is placed in its forward position, diode 7, capacitor 6, resistor 8 and diode 9 act as a half-wave rectifier circuit with capacitor input filter, providing DC voltage to the field. Likewise, if switch 27 is placed in the reverse position, switch 5 now being in its normally closed position, diode 34, capacitor 6, resistor 8 and diode 31 serve a similar function. A surge suppressor circuit 51 is electrically connected across the AC line for protection against voltage transients. Resistor 8 is electrically connected via a line 36 to a voltage divider comprised of a resistor 29 and a resistor 30. Resistor 8 is also electrically connected through a resistor 10 to a base 52 of a transistor 11. A capacitor 50 is electrically connected between the base 52 and a collector 53 of transistor 11. Collector 53 is also electrically connected through a resistor 54 to one side of the supply voltage via a line 48, and through a diode 22 to a base 55 of a transistor 12. A current limiting circuit is provided by the action of a resistor 24, a resistor 25, and a diode 26, electrically connected via a line 56 to the base 55 of transistor 12. A collector 57 of transistor 12 is electrically connected to a base 58 of a transistor switch 13 through a resistor 23 and to the supply line 48 through a diode 38. Base 58 of transistor 13 is also electrically connected to the supply line 48 through a resistor 39, and a capacitor 37 is placed between base 58 and a collector 59. Transistor 13 is electrically connected in parallel with a capacitor 14. Capacitor 14 stores the signal applied to a transistor amplifier 15. This signal is comprised of a negative feedback representation of armature speed provided via a line 19 and a resistor 20; a speed command signal generated by an external speed command circuit 3 and provided via a line 42, a diode 43 and a resistor 44; and the IR compensation signal developed in the resistor 24 and applied via line 56 to a transistor 60 through a diode 61 biased by a resistor 62, the gain of the transistor 60 being partially adjustable by a potentiometer 63. These three signals are electronically mixed at a base 64 of the transistor 15 and provide the input for a capacitor 16. Capacitor 16 is electrically connected to an emitter 65 of a unijunction transistor 17. The output of the unijunction transistor 17 is connected via a transformer 18 to a silicon controlled rectifier circuit 4 comprised of silicon controlled rectifiers 40 and 41. A diode 28 is electrically connected from the resistor 29 of the voltage divider to the capacitor 14. A diode 66 and a resistor 67 are electrically connected to the base 64 of amplifier 15 via line 42. An emitter 68 of amplifier 15 is electrically connected through a resistor 69 to one side of the voltage supply and through a resistor 70 to line 36, said line being a common connection to the second side of the voltage supply represented by diodes 31 and 9. Because of the voltage distribution present in the control circuit, the bias apportionment provided by the components, that is, diode 66, resistor 67, resistor 69 and resistor 70 is necessary in order to achieve zero armature speed if such is commanded by the external speed command circuit 3. A collector 71 of a transistor 74 is electrically connected via a line 76 to capacitor 16. A base 73 of transistor 74 is electrically connected through a resistor 72 to a collector 79 of a transistor 75. An emitter 77 of transistor 75 is electrically connected via a line 80 to the cathode side of a diode 47. A base 78 of transistor 75 is connected to the anode side of diode 47. Diode 47 is connected to one side of the full-wave rectifier represented by diodes 32 and 33 through a resistor 21. Transistors 74 and 75 and resistor 72 synchronize the unijunction transistor 17 to the supply voltage by providing a means of discharging capacitor 16 without the necessity of an input pulse to the unijunction transistor 17. A Zener diode 46 and a capacitor 45 provide regulated and filtered input voltage to power the transistor amplifier 15.

In operation, the setting of switch 5 to the forward position connects the field 2 and capacitor 6 with the line through diode 7 and the normally closed switch 27. The activation of the forward switch 5 also results in the production of a pulsating current through resistor 8. The voltage developed over resistor 8 in turn causes a current to flow through and thus develops a voltage across resistor 10. The voltage developed over resistor 10 provides a bias to transistor 11 causing it to reach saturation or to conduct. Capacitor 50 acts as a filter for the signal evolved because of the pulsating current in resistor 8. Conduction of transistor 11 draws current from resistor 54, diverting that current from the base 55 of transistor 12, thereby causing transistor 12 to fall below saturation, or in effect turning off. Nonconduction of transistor 12 in turn, causes transistor 13 also to fall below saturation. At this instant capacitor 14 is free to charge at the time constant of the circuit. The charge stored in capacitor 14 is then applied via transistor 15 to determine a charging rate in capacitor 16. The charging rate and discharge of capacitor 16 coacts with the unijunction transistor 17 to provide a cyclic time-oriented pulse which is coupled via transistor 18 to the SCR circuit 4. The firing angle of the SCR circuit 4 advances until the feedback signal developed via line 19 across resistor 20 negates the command signal generated in external speed command circuit 3 and the IR compensation signal originally developed across resistor 24. When such balance is accomplished, steady state operation at command speed is achieved.

If the forward contact 5 is at any subsequent time moved to its normally closed or off position, that is, disengaging the field from its source of excitation, no current pulse will occur in resistor 8. Transistor 11 will not be reset to saturation due to the loss of signal over resistor 10. Capacitor 50 and resistor 10 are chosen such that the voltage seen by diode 22 will rise sufficiently so as to bias that diode into conduction in less than one-half cycle. Conduction of diode 22 biases transistor 12 causing it to reach saturation and commence conduction. The current drawn by transistor 12 develops a voltage across resistor 23, which voltage in turn biases transistor 13 causing it to conduct. Conduction by transistor 13 discharges capacitor 14. The discharge of capacitor 14 removes signal command from amplifier 15. Loss of signal at amplifier 15 removes all firing pulses to the SCR circuit 4. While the SCR circuit is thus being shut down, the field inductance maintains field current at a value somewhat less than normal as it transfers its energy to capacitor 6. While it is apparent that field current immediately decreases, and therefore motor back electromotive force decreases, the resonant type of discharge occuring due to the field inductance and capacitor 6, limits the rate of change seen by the armature circuit to a level sufficiently small to permit the current limiting circuit, represented by resistor 24, resistor 25, and diode 26 in conjunction with transistor 12, time to become operative. While current limiting circuits are known in the prior art, the application here tends to increase the ability of the control circuit described to remove the firing signal from the SCR circuit 4 by further driving transistor 12 into saturation, which in turn maintains transistor 13 in saturation and capacitor 14 discharged.

Where, instead of the above, switch 5 is moved to its normally closed position and switch 27 is immediately moved to the reverse position, there is an instantaneous reversal of the voltage seen by the field 2. Capacitor 6 will be charged in the opposite direction by the inrush of current. Field current will change at a rate limited by the field inductance. This rate of change however, will be faster because of the reversed voltage on capacitor 6. In order that this situation does not place too great a demand on the current limit circuitry, the large peak voltage which a sudden reversal of voltage on capacitor 6 places across resistor 8 is coupled directly to reset capacitor 14 via diode 28 and the voltage divider, resistor 29 and resistor 30. After the initial pulse of current reversing capacitor 6 voltage, the energy of the field inductance acts so as to increase such reversed capacitor voltage, preventing further current in resistor 8 while the field current is decaying to zero. Since there is no signal across resistor 8, transistor 11 will not be conducting. The consequence of this nonconduction is that transistors 12 and 13 will be maintained in saturation, removing any firing signal to the SCR circuit 4. The current limiting circuit also aids in maintaining transistors 12 and 13 in saturation while the field current is decaying to zero and reversing. Once reversal takes place, the signal obtained from resistor 8 will turn transistor 11 on with the eventual consequence that capacitor 14 will once again be able to start the firing signal sequence to the SCR circuit 4. The presence of the bipolar capacitor 6 allows easy interruption of the field circuit while aiding in the ability to protect the armature circuit during the period of reduced field circuit.

While the field current is thus reversing, armature back electromotive force is also reversing and mechanical rotational energy is being dissipated as electrical energy in the motor armature circuit across resistor 24 and diode 84. Diode 84 is useful as a discharge path for the armature in addition to its function in regulation of the IR compensation signal described in my copending application Ser. No. 872,535 filed Oct. 30, 1969. The motor is thus brought to a stop before the new voltage rise of capacitor 14 reinitiates the firing impulse to the SCR circuit 4.

Merely by way of example, when applied to a DC motor rated in the vicinity of one-half horse power, and field resistance of the motor approximates 630 ohms at 25° C, the circuit described above performs well with a 20 mfd. capacitor 6 and a 10 ohm resistor 8.

Numerous variations in the control circuit for this invention within the scope of the appended claims will occur to those skilled in the art in the light of the foregoing disclosure. Equivalent components can be substituted. Thus, electronic switching devices, for example, silicon controlled rectifiers, may be substituted for the conventional switches shown in the drawing and all such devices are encompassed within the means of reversing the terminal voltage polarity as used in the appended claims. Different circuitry in the conventional portion of the control can be used. For example, referring to FIG. 2, the unijunction transistor 17 may be synchronized to the supply voltage without the use of transistors 74, 75, and resistor 72 by disconnecting base 2 of unijunction transistor 17 from the line 48 at anode 81 on the cathode side of diode 47 and reconnecting said base 2 at same point on the anode side of diode 47. Still another exemplary change would be in a motor application that did not require the use of IR compensation for speed regulation. In such a situation resistor 62, diode 61, transistor 60 and potentiometer 63 could be eliminated without affecting the operation of the invention disclosed herein. The same can be said for diode 43 and resistor 44, whose functions are concerned with the operation of the speed command circuit 3 and thus are not strictly involved in my invention. These variations are merely illustrative.

Having thus described the invention, what is claimed and desired to be secured by Letters Patent is:

1. In a speed control circuit for DC electric motors having field windings and a wound rotating armature wherein armature speed is controlled by varying armature voltage and means are provided for transposing terminal polarity of the motor field, the improvement in means for bidirectional operation of the armature, comprising a capacitor in parallel with the motor field, said capacitor facilitating field circuit interruption, and means responsive to loss of field current comprising a switch electrically connected in said speed control circuit such that loss of field current causes said switch to open, which opening initiates control of armature voltage by said speed control circuit.

2. The improvement of claim 1 where the switch is a transistor.

3. The improvement of claim 1, where the armature voltage control includes an armature current limiting circuit, further characterized by the use of a resistor, responsive to the existence of field current, to produce the signal that maintains a transistor switch in saturation, the loss of which signal places the transistor in its nonconducting state, thereby activating said current limiting circuit, said activation closing a second transistor switch removing the input signal to the armature voltage control.

4. In a speed control circuit for DC electric motors, including a means to control armature voltage electrically connected to the output of an amplifier, a speed command potentiometer electrically connected to said amplifier, a negative feedback loop, indicating motor speed, electrically connected to said amplifier, a capacitor electrically connected to said amplifier, and a current limiting circuit electrically connected to said amplifier, comprising an armature circuit resistor, a diode and a current limiting circuit transistor, said diode being electrically connected to the base of said current limiting circuit transistor, the emitter of which transistor is electrically connected to a common conductor, and the collector of said limiting circuit transistor being electrically connected through a third resistor to the base of a transistor switch, said switch being electrically connected in parallel to the capacitor through the emitter and collector of said switch, the capacitor providing an input signal to said amplifier, the improvement comprising means to facilitate directional reversal, said reversal facilitating means comprising a field sensory resistor electrically connected to the motor field, a second resistor, and a field loss transistor having the base electrically connected to said field sensory resistor through said second resistor, the emitter of the field loss transistor being electrically connected to a common conductor and the collector of said transistor being electrically connected to the base of the current limiting circuit transistor, wherein loss of field current in the field sensory resistor causes loss of bias for the field loss transistor, causing it to cease conduction, thereby allowing the current limiting circuit transistor to reach its conduction state, which conduction provides bias to the transistor switch, closing said switch and discharging the capacitor, thereby removing input signal from the amplifier.

5. In a speed control circuit for DC electric motors, including a speed command potentiometer electrically connected to an amplifier, a negative feedback loop, indicating motor speed, electrically connected to said amplifier, a current limiting circuit electrically connected to said amplifier, means to control armature voltage electrically connected to said amplifier, and switch means for reversing the terminal voltage polarity of the motor field, the improvement comprising a capacitor electrically connected in parallel with the motor field and across said voltage reversing switch means which capacitor acts as a bipolar discharge path for the field inductance thereby permitting the interruption of the field circuit by said switch means and limiting the rate of change in the field as seen by the armature circuit during such interruption to a level sufficiently small to permit the regulation of armature voltage.